United States Patent Office 3,440,726
Patented Apr. 29, 1969

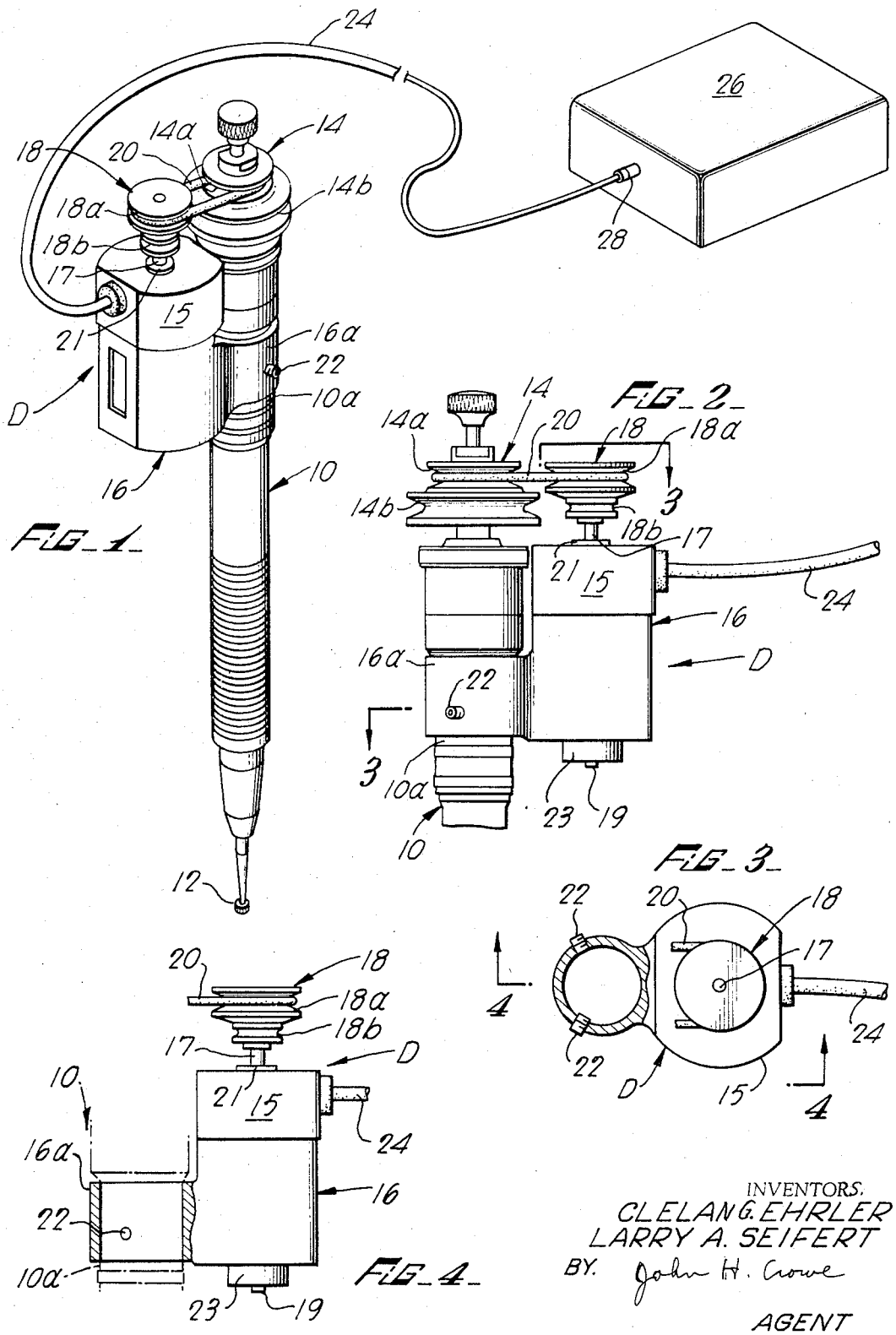

3,440,726
DRIVE MEANS
Clelan G. Ehrler, Loma Linda, and Larry A. Seifert, Colton, Calif., assignors to Golden-West Dental, Inc., Garden Grove, Calif.
Filed Oct. 20, 1965, Ser. No. 498,684
Int. Cl. A61c 1/06
U.S. Cl. 32—23                                    1 Claim

ABSTRACT OF THE DISCLOSURE

An accessory drive unit for a standard dental handpiece. The unit is a small, compact, lightweight assembly, powered by a miniaturized, low voltage DC electric motor and fitted with a sleeve into which the barrel of the handpiece snugly fits. The unit has associated belt drive hardware and is designed for attachment to the handpiece and use in place thereon. This permits the handpiece to be used anywhere low voltage DC current, from a battery or elsewhere, is available, and without the bulky powering apparatus. Typically requiring AC current, conventionally employed for handpiece operation.

---

This invention relates generally to accessory drive means for miniaturized power tools designed to operate under relatively high torque loads and especially to such drive means having particular utility for the powering of dental tools such as dental drills or the like.

Dental drills are more acurately referred to as handpieces, a handpiece being a barrel-like member with a rotatably mounted center shaft to one end of which is coupled a dental burr, or equivalent work head. A handpiece is powered for use by supplying mechanical energy to its rotatably mounted shaft, thereby causing the shaft to turn the burr, or equivalent member, rapidly for the grinding, or other treatment, of human teeth.

Dental handpieces are conventionally powered by either of two commonly used drive systems, one utilizing belt drive, and the other air drive, means to effectuate its necessary energy transmission function, the former, which has, as will be seen, particular significance relative to the present invention, being hereinafter referred to simply as the belt drive system. The belt drive system is physically distinguished by an ovrehead arm structure of a type familiar to anyone who has ever visited a dental office and it furnishes mechanical power to a dental handpiece by means of a long drive belt connecting a pulley on the handpiece shaft to a drive pulley on an AC electric motor relatively far removed therefrom. The overhead arm structure is used to maintain the proper belt linkage between the handpiece and drive motor pulleys while the handpiece is manipulated, within the permissible reach and flexibility ranges of said arm structure, in service.

There is no necessity of going into a detailed description of the mechanical, structural and performance particulars of the belt drive system since these are all known to those skilled in the dental arts. Suffice it to say, as will be obvious even to persons generally unfamiliar with the tools of the dental profession, the structural complexity of the necessary apparatus for operation of the belt drive system of handpiece operation is necessarily great in order to provide the proper guidance, tension, etc., for the moving belt as a handpiece driven thereby is moved about by a dentist at work. Furthermore, the nature of the system is such as to permit only imperfect freedom of handpiece movement, in spite of its structural complexity.

As previously indicated, the beltd rive system typically requires alternating current for its operation, thus limiting its range of usefulness to substantially permanent installations in dentists' offices, clinics, and the like, and precluding, for the most part, its use in remote areas of the world lacking in convenient sources of AC energy. Moreover, the bulk and awkwardness of the belt drive apparatus mitigates against its ease of portability and consequence suitability for field, and other, uses involving moving of the equipment from place to place.

In addition to its general lack of portability and restrictive influence on freedom of handpiece movement, the above-described equipment is further disadvantaged by costliness. This, of course, limits its extent of availability, even to dental offices but even more so to dental schools which require much in the way of laboartory equipment with which to properly train their students. Shortages of such equipment because of its expense limits the number of students the dental schools can effectively handle thereby depriving some individuals of a free choice of professional study and dental profession of potential practitioners who might be sorely needed to fill its ranks.

We have now devised a compact accessory drive unit for dental handpieces which can be easily and quickly installed for service with a minimum of conjunctive hardware. Our new drive unit is, as will be seen, so low in first cost as to permit its acquisition in almost unlimited supply by even low budget dental schools and its costs of operation, repair and maintenance are practically negligible, in contrast to the corresponding costs of comparative dental equipment of the above-described type. Our new drive unit is installed for service directly on the barrel of a handpiece and it is so small and light in weight, and so free of support and other accessory hardware, as to leave the handpiece practically as light and maneuverable as it would be without the unit. Moreover, our accessory drive unit is powered by low voltage DC current, thereby assuring its portability and usage anywhere such a source of current is available, this being virtually anywhere in view of the ease with which suitable batteries can be provided, and obviating the possibility of serious electrical shock to the handpiece operator. The latter feature (DC activation) of the drive unit is important in that it enables the unit to supply the high torque needed for dental work (the high torque demands of such work being a matter of common knowledge to those skilled in the dental arts) without having to rely upon an AC outlet for its energy needs as does the belt drive system for powering dental handpieces.

It is thus a principal object of this invention to provide a compact, light weight, and low cost drive unit for a dental handpiece which can be easily and rapidly attached to the handpiece to permit substantially unhindered use, and freedom of movement, of the latter with the unit so attached.

It is another object of the invention to provide such a handpiece drive unit of ready portability and adaptability for service in remote areas lacking the necessary facilities for installation and use of presently conventional handpiece drive equipment.

It is still another object of the invention to provide such a handpiece drive unit which is the utmost in structural simplicity and which requires no cumbersome or complex support, or other conjunctive, hardware to hinder or restrict maneuverability of the handpiece in use.

It is yet another object of the invention to provide such a unit of dual speed, and concomitant torque, range versatility to adapt it for use under a variety of work demand conditions.

It is still another object of the invention to provide such a drive unit free of any possibility of serious electrical shock to the operator of a handpiece driven thereby.

Other objects, features and advantages of our invention will become apparent as the description thereof proceeds.

The construction, manner of installation, and means of functioning of our novel handpiece drive unit will be better understood by reference to the accompanying drawing, of which:

FIGURE 1 is a perspective of a conventional dental handpiece with a preferred embodiment of our drive unit installed thereon in operating position, the unit being shown in plug-in connection in a DC circuit, the necessary connecting cord being illustrated in interrupted view with that part farthest removed from the drive uit being shown in reduced scale for greater convenience of illustration.

FIGURE 2 is a slightly enlarged fragmentary view of the handpiece and drive unit showing the latter in rear elevation relative to its FIGURE 1 orientation.

FIGURE 3 is a view, partly in cross section and partly in plan, of the drive unit taken along line 3—3 of FIGURE 2 but omitting the handpiece for simplicity's sake.

FIGURE 4 is a view, partly in section and partly in elevation, of the drive unit, taken along line 4—4 of FIGURE 3 but showing a fragmentary section of the handpiece in phantom outline to illustrate the manner of installation of the unit thereon.

Considering now the drawing in greater detail, there is shown in FIGURES 1 and 2 a standard dental handpiece 10, and attached burr 12, with a preferred embodiment of our drive unit, indicated generally at D, mounted thereon in proper operating position. Handpiece 10 has, as a standard accessory, a stepped pulley 14, characterized by two belt grooves 14a and 14b, coupled to its central shaft for use conjunctively with conventional belt drive means of operating the handpiece. Stepped pulley 14 will be, by virtue of its standard handpiece accessory status, a familiar feature to those skilled in the dental arts and there is, hence, no necessity for here discussing it in greater detail.

The heart of drive unit D is a high torque, high speed, 12-volt DC motor, not shown, on the drawing, of a type presently utilized to a large extent for slot car racing purposes. The motor is readily available on the market, thus obviating any necessity for detailing it in the drawing. For this reason drive unit D is depicted with its motor substantially encased in a metal housing consisting of a major lower section 16 and a cap section 15 which fit together in the illustrated manner to surround almost all of the motor except its shaft ends, shown at 17 (upper end) and 19 (lower end) on said drawing. The motor is fixedly secured in place within its housing by known means, not necessary to go into here, with its shaft projecting through positionally secured bearing members 21 and 23 defining openings in the upper and lower ends, respectively, of the motor housing.

Lower section 16 of the motor housing has an integral sleeve appendage 16a offset to one side of the motor, as illustrated. Sleeve appendage 16a, hereinafter referred to simply as sleeve 16a, has an inner bore sized to snug fitting interfit with a particular segment 10a of the handpiece barrel. Drive unit D is mounted on handpiece 10 by slipping sleeve 16a up around its barrel until the upper rim of the sleeve abuts a sloping shoulder segment thereof defining the upper limit of its segment 10a, and then fastening the sleeve in place on the handpiece. The drive unit is thus fastened by means of two set screws 22 which pass through tapped openings with matching threads in the walls of the sleeve to locking contact with the barrel wall of the handpiece, as illustrated in the drawing.

The drive unit motor is mounted in shaft parallel relationship to handpiece 10 and upwardly projecting end 17 of its shaft has a stepped pulley 18 mounted thereon and held in place by set screw means, not shown. Pulley 18 has two pulley grooves, an upper one 18a and a lower one 18b, the latter having an effective diameter substantially smaller than the former, as the drawing shows. The position of the stepped pulley on the shaft of the drive unit motor is such as to station its two pulley grooves in respectively coplanar relationship with the pulley grooves in stepped pulley 14 on the handpiece when the drive unit is mounted for service on the latter as taught herein. The two grooves of pulley 14, previously identified as belt grooves 14a and 14b, are of differing effective diameters and oriented, as FIGURE 2 shows particularly well, with the one of smaller diameter below the other. Stepped pulley 18, on the other hand, is oriented in just the reverse fashion, that is, with its pulley groove of larger effective diameter positioned above the one of smaller effective diameter.

As will be apparent from the foregoing, and the applicable drawing ilustrations, the two pairs of coplanar pulley grooves in stepped pulleys 18 and 14 comprise alternative belt drive runs in closely overlying-underlying relationship. It should perhaps be noted, although it will by now be obvious from the drawing, and the present description thereof, that the two cooperating pairs of pulley grooves defining the aforesaid belt drive runs are sized to alternatively receive a single connector belt, shown at 20 on the drawing, hereinafter to be described in greater detail.

As the drawing shows, the effective diameter of the larger pulley grove 18a of drive unit D is close to that of the smaller pulley groove 14a of handpiece 10 and these two grooves are coplanar. Also, the pulley groove of smaller effective diameter (18b) on the drive unit pulley is coplanar with that of larger diameter (14b) on the handpiece pulley. This, of course, permits a first belt coupling arrangement with nearly equal pulley diameters in the driver and driven pulley units, and an alternative coupling arrangement with a smaller effective pulley diameter on the driver pulley than the driven one. As those skilled in the dental, as well as the general mechanical, arts will appreciate, these two pulley coupling arrangements represent relatively high speed and high torque (at slower speed) ranges of handpiece operation, respectively. The here-involved mechanical principals are so well known to those familiar with dental equipment as to require no further discussion here.

The selection of suitable pulley diameter ratios to deliver the above-indicated results is well within the skill of those to whom these teachings are directed, particularly when undertaken with the aid of the accompanying drawing. In the latter connection, it can be pointed out that the drawing is a copy of an actual drive unit made by us and tested conjunctively with a standard handpiece of the type illustrated which, as those skilled in the dental arts will appreciate, is of a typically common variety. Using the handpiece drawing as a guide for comparison, one familiar with dental equipment can readily appreciate the small and compact size of drive unit D. More precisely indicative of this size, the actual dimensions of the housing of the above-mentioned drive unit were 1¾ by 1½ inches, those measurements representing the height and greatest cap cross sectional dimension of the unit, respectively. Other drive unit, as well as certain handpiece, dimensions indicative of the small size and compactness of the former are set forth below, the involved parts and features of drive unit and handpiece being denoted by the reference characters of their counterparts of the accompanying drawing.

|  | Inch |
|---|---|
| Projection distance above cap 15 of the motor housing of motor shaft end 17 | ¾ |
| Axial dimension of stepped pulley 18 | ½ |
| Effective diameter of pulley groove 14a | ½ |
| Effective diameter of pulley groove 14b | ⅞ |
| Effective diameter of pulley groove 18a | ⅝ |
| Effective diameter of pulley groove 18b | ⅜ |

The above-listed handpiece pulley groove diameters are, as those familiar with dental instruments will attest, typical of those found in handpieces of the type under present consideration.

As previously indicated, handpiece 10 is driven by unit D through a connector belt 20 which, also as previously indicated, is slipped into either of the above-noted pairs of coplanar pulley grooves in stepped pulleys 14 and 18, one such belt connection giving rise to high torque, at relatively slow speed, operation of the handpiece and the other to higher speed, and lower torque, operation thereof. Drive belt 20 is a resilient O-ring, made of rubber or an equivalently suitable material, which can be easily slipped from one pair of coplanar pulley grooves to the other because of its elasticity, and which can be used interchangeably on either pair because each is, as previously made clear, designed to receive the same, or an equivalently sized, drive belt in functioning capacity.

Handpiece 10 with drive unit D mounted thereon as taught herein has dual speed performance versatility in that it can, as previously emphasized, be operated at a drive belt position of either predominantly high torque and lower speed or higher speed and lower torque character. More specifically, the higher speed belt position results in handpiece shaft speeds of up to about 20,000 r.p.m., and the high torque position, speeds of up to about 5,000 r.p.m. at torques of from about 1.5 to about 2.0 inch-ounces, these performance ranges being more than sufficient, as those skilled in the dental arts will appreciate, for ordinary dental operations.

Enough has now been said to reveal the structural particulars and performance capabilities of the pictured handpiece drive unit, and to indicate its wide range of versatility, with emphasis on its ability to transform low voltage electrical current into high torque mechanical energy. It will thus be apparent that operation of handpiece 10 under the influence of the drive unit yields performance results equivalent to those of a handpiece powered by the conventional belt drive system apparatus, but with substantially greater freedom of handpiece movement than the latter affords and without its dependence upon AC current for its activating energy.

Drive unit D receives its power from a low voltage energy source such as, for example, a 12-volt battery or a converter of the type which transforms standard 110-volt AC electricity into low voltage DC current flow. As previously indicated, the drawing symbolically depicts, without graphic detail, such a power source at 26, the detail being omitted because batteries and components for dispensing low voltage DC energy are well known to those knowledgeable in the here-involved arts and it would be well within their ordinary skills, employed in the light of present teachings, to provide a suitable source of power for the drive unit.

It is contemplated that suitable control means for switching and, ordinarily, speed control purposes, will be incorporated as desired in the drive unit circuits of this invention, and detail relative thereto is omitted from the drawing for substantially the same reason the above-discussed power source detail was omitted, namely, the competence of those skilled in the dental and related art to, in the light of present teachings, supply any such control means called for under the individual circumstances. As an example of the kind of control equipment here contemplated, a suitable rheostat can be incorporated in the drive unit control circuit, either as a separate component with accessory foot, or other, control means, or as a part of a converter package which can be plugged into an AC outlet for the conversion of standard 110-volt electricity into a suitable form for our purpose.

While that part of the FIGURE 1 system shown at 26 has been heretofore referred to as a power source, it is actually intended to have broader significance and thus represent anything from a pure power source, itself, to a package, or assembly, including such a source (as, for example, a convertor) and conjunctive control equipment (as, for example, a speed control rheostat), as well as any accessory components, hardware, etc., which might be present. An assembly of this general type is illustrated and described in FIGURE 5 and lines 59–65 of column 2 of U.S. 3,210,847 to Prüfer. This method of diagrammatic presentation is common in patent drawings showing known parts and assemblies and a proper way of illustrating such parts and assemblies when it is desired to show their physical tie-in with, or relationship to, inventive subject matter.

Drive unit D, as previously noted, is connected to its power source by means of a conductor cord 24, the cord connection to the power source being shown at 28, specific detail, here again, being omitted for the same reason as set forth above in justification of the omission of power source detail from the drawing.

Miniaturized, high torque DC motors suitable for incorporation in the drive unit of our invention are, as previously indicated, readily available on the market. All such motors, however, require modification to a greater or lesser extent to suit them for our particular purpose, since none have been designed with that purpose in mind. Many such motors are intended for slot-car racing purposes, as was the one incorporated in the above-mentioned drive unit built and tested by us. The latter motor was a miniaturized power plant of Japanese manufacture, sold in the United States through various dealers and identified as Mabuchi Motor FT–170–NC (the manufacturer being Mabuchi Co. of Japan).

The Mabuchi FT–170–NC motor has a speed at no load of 27,500 r.p.m.; a torque at 17,500 r.p.m. of 0.06 inch-ounce; a horsepower of 0.0067, and it draws a current of 4 amps at 16,000 r.p.m. The motor, in its off-the-shelf form, weighs only 2.054 ounces, thus evidencing the extreme lightness of our new drive unit which, as indicated above, is so little burden to a handpiece mount that the latter can be used with substantially no more effort or strain than its use without the attached unit would occasion. In the latter connection, the addition of a housing member such as member 16 of drive unit D to the motor contributes little to its weight, the thus-enclosed motor weighing from about 2.5 to about 3.0 ounces, depending upon the enclosure member design which, in turn, depends upon the type of handpiece which its sleeve attachment is designed to fit. Handpiece types vary in size and shape, but only enough to cause the neglibly small (0.5 ounce) weight variation noted above among enclosed motors designed for mounting fit thereon in accordance with this invention.

While motors suitable for the powering of our drive units are, as indicated, readily available, we wish to emphasize that they all require modification to suit them for our specialized use. In illustration of this, the Mabuchi motor of above reference had a floating upper bearing, no stepped pulley, no housing member (with attached sleeve) equivalent to member 16 of drive unit D, nor any cap equivalent to cap 15 of unit D, as it came from the shelf and to suit it for our purpose, we modified the unit by substituting a fixed bearing, exemplified by bearing 21 in unit D, for the aforesaid floating bearing; installing a stepped pulley, exemplified by pulley 18, on the motor shaft; partially enclosing it in a housing segment of the type exemplified by housing member 16 of unit D; and installing a cap, such as exemplified by cap 15 of unit D, thereon. The motor was thus transformed into a drive unit of substantially changed appearance, structural make-up and functioning capacity by these modifications, as well as others of a minor nature well within the capabilities of those skilled in the art in the light of present teachings.

The foregoing catalog of illustrative modifications spotlights the above-noted necessity of shelf motor redesign as an important facet of this invention. In further emphasis of this aspect of the invention, a number and variety of miniaturized DC motors are, as previously indicated, available for purposes of said invention as are a number and variety of handpieces, with which those skilled in the dental arts will be familiar, receptively available to the benefits accruing therefrom. The significance of these facts as evidence of the critical role shelf motor modification plays in the practice of our invention is believed evident without further comment.

The particularly illustrated embodiment of our invention has been herein described and discussed in considerable detail in order to comply with the legal requirement for a full public disclosure of the invention, as well as to stress the above-noted advantages of compactness, low weight, lack of cumbersome and/or complex support and other accessory hardware, low cost, portability, freedom of movement, ease of installation, ease of use and versatility of operation of our novel handpiece drive unit. Relative to the low cost feature of our drive unit, it is pointed out that the initial cost of the unit is the merest fraction of the cost of the conventional belt drive powering equipment discussed at length above and that this is reflected in lower repair costs of the former by comparison with the latter.

While our novel handpiece drive unit has been illustrated in the accompanying drawing in what is presently conceived to be a preferred embodiment, it will be recognized by those skilled in the dental arts that numerous modifications of that embodiment can exist within the scope of the present invention. Certain of these modifications have already been discussed above, and others will occur to those skilled in the art in the light of present teachings. Exemplary of the latter are such changes as noncritical modifications of the shapes of the various structural features of the drive unit, elimination of certain features which are not critically essential to the proper functioning of the unit, etc.

More specific examples of the kind of unit modification above contemplated include variations in its motor housing design; variations in its handpiece attachment hardware such as, for example, the substitution of a swivelling sleeve supported at the proper height on a handpiece mount barrel by a separate ring fixedly secured to the handpiece; the substitution of other means of fastening the drive unit to its handpiece mount for the set screw means illustrated in the drawing; the substitution of a drive pulley of other design for the stepped pulley of the drawing, including the substitution of such a pulley with other than two pulley grooves, with pulley grooves of differing effective diameter ratios, etc.; the substitution of a belt of a different type, such as, for example, a V-belt, for that illustrated in the drawing; etc.

While the preferred use of our drive unit is for the powering of dental handpieces, it can, of course, be employed to drive miniaturized tools other than handpieces, so long as it functions in substantially the same way as that taught herein relative to its handpiece utility. By "miniaturized tools," as that term is employed here, and in the following claims, is meant tools essentially similar in size magnitude, power requirements and torque demands, as well as methods of mechanical functioning, to dental handpieces. Finally, to avoid any misunderstanding as to the scope of coverage of the recitation "means for securing said sleeve-like member to said handpiece with the latter inserted to a snug fit within its sleeve bore," we wish to here explain that the quoted language broadly includes means which secure the "sleeve-like member" to the handpiece in swivelling relationship, as well as such means which secure it tightly, thereto.

It is emphasized, in final summary, that any drive unit varying in form from the drawing-illustrated embodiment of our invention falls within the scope of the invention as long as it is encompassed by the following claim.

We claim:

1. In combination: a portable dental handpiece comprising a generally cylindrical housing having an axially extending shaft journalled therein and having driven pulley means fixed thereon axially adjacent one end of said housing; a miniature electric motor mounted in an encasement and having drive pulley means thereon rotatable about an axis parallel to but laterally spaced from the axis of said shaft; said encasement having an integral cylindrical sleeve laterally of said motor and loosely embracing said generally cylindrical housing; cooperating shoulder means on said sleeve and said housing for positioning said driving and driven pulley means in mutual radial alignment; releasable securing means fixedly holding said sleeve in said described relation to said housing; and a self-contained source of electric power for said motor.

References Cited

UNITED STATES PATENTS

| | | | |
|---|---|---|---|
| 849,702 | 4/1907 | Sevier | 32—28 |
| 950,759 | 3/1910 | Weiner | 32—23 |
| 2,078,859 | 4/1937 | Lapham. | |
| 2,894,325 | 7/1959 | Flatland | 32—27 |
| 2,899,745 | 8/1959 | Flatland | 32—28 |
| 3,210,847 | 10/1965 | Prufer | 32—27 |
| 3,248,792 | 5/1966 | Staunt | 32—26 |

FOREIGN PATENTS

| | | |
|---|---|---|
| 865,783 | 8/1953 | Germany. |
| 290,974 | 4/1929 | Great Britain. |

ROBERT PESHOCK, *Primary Examiner.*

U.S. Cl. X.R.

32—26